(12) United States Patent
Xiong (10) Patent No.: US 11,131,430 B2
(45) Date of Patent: Sep. 28, 2021

(54) LIGHTING DEVICE, LUMINAIRE AND MANUFACTURING METHOD

(71) Applicant: SIGNIFY HOLDING B.V., Eindhoven (NL)

(72) Inventor: Yan Xiong, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 48 days.

(21) Appl. No.: 16/500,282

(22) PCT Filed: Apr. 9, 2018

(86) PCT No.: PCT/EP2018/058951
§ 371 (c)(1),
(2) Date: Oct. 2, 2019

(87) PCT Pub. No.: WO2018/189061
PCT Pub. Date: Oct. 18, 2018

(65) Prior Publication Data
US 2021/0102669 A1 Apr. 8, 2021

(30) Foreign Application Priority Data

Apr. 12, 2017 (WO) ................ PCT/CN2017/080224
May 23, 2017 (EP) ..................................... 17172348

(51) Int. Cl.
*F21V 3/00* (2015.01)
*F21V 17/00* (2006.01)
(Continued)

(52) U.S. Cl.
CPC .............. *F21K 9/233* (2016.08); *A01K 45/00* (2013.01); *F21K 9/90* (2013.01); *F21V 3/061* (2018.02);
(Continued)

(58) Field of Classification Search
CPC .......... F21V 29/15; F21V 3/061; F21V 17/10; F21K 9/233; F21K 9/237; A01K 45/00
See application file for complete search history.

(56) References Cited

U.S. PATENT DOCUMENTS 2,889,952 A 6/1959 Claypoole
6,773,141 B2 8/2004 Zhao et al.
(Continued)

FOREIGN PATENT DOCUMENTS

CN 102748714 A 10/2012
CN 105090809 A 11/2015
(Continued)

*Primary Examiner* — Karabi Guharay
(74) *Attorney, Agent, or Firm* — Daniel J. Piotrowski (57) ABSTRACT

A lighting device (10) is disclosed comprising a glass housing (20) delimiting an optical chamber (21), wherein at least one solid state lighting (SSL) element (30) is mounted within the optical chamber. The optical chamber (21) further comprises a light exit window (50) mounted in an aperture (23) of the optical chamber opposite the at least one solid state lighting element, the light exit window comprising a sealing plate sealed to the glass housing by a glass seal (51); and a light-transmissive thermal barrier (40) extending across the optical chamber in between the sealing plate and the at least one solid state lighting element, which protects the at least one SSL element (30) from thermal damage during the formation of the glass seal (51). Also disclosed are a luminaire including such a lighting device and a method of manufacturing such a lighting device.

15 Claims, 6 Drawing Sheets

(51) Int. Cl.
*F21K 9/233* (2016.01)
*F21V 29/15* (2015.01)
*F21V 3/06* (2018.01)
*A01K 45/00* (2006.01)
*F21K 9/90* (2016.01)
*F21V 7/22* (2018.01)
*F21V 17/10* (2006.01)
*F21V 31/00* (2006.01)
*F21Y 115/10* (2016.01)

(52) U.S. Cl.
CPC ................ *F21V 7/22* (2013.01); *F21V 17/10* (2013.01); *F21V 29/15* (2015.01); *F21V 31/005* (2013.01); *F21Y 2115/10* (2016.08)

(56) References Cited

U.S. PATENT DOCUMENTS

| 9,205,505 B2 | 12/2015 | Sridharan et al. |
| 2018/0351052 A1* | 12/2018 | Yoo ........................ H01L 33/502 |

FOREIGN PATENT DOCUMENTS

| EP | 0551647 A1 | 7/1993 |
| WO | 2013034492 A1 | 3/2013 |
| WO | 2013175356 A1 | 11/2013 |

* cited by examiner

LIGHTING DEVICE, LUMINAIRE AND MANUFACTURING METHOD

CROSS-REFERENCE TO PRIOR APPLICATIONS

This application is the U.S. National Phase application under 35 U.S.C. § 371 of International Application No. PCT/EP2018/058951, filed on Apr. 9, 2018, which claims the benefits of European Patent Application No. 17172348.9, filed on May 23, 2017, which claims the benefits of Chinese Patent Application No. PCT/CN2017/080224, filed on Apr. 12, 2017. These applications are hereby incorporated by reference herein.

FIELD OF THE INVENTION

The present invention relates to a lighting device comprising a glass housing delimiting an optical chamber, wherein at least one solid state lighting element is mounted within the optical chamber, the optical chamber further comprising a light exit window mounted in an aperture of the optical chamber opposite the at least one solid state lighting element.

The present invention further relates to a luminaire comprising such a lighting device, and to a method of manufacturing such a lighting device.

BACKGROUND OF THE INVENTION

Solid state lighting such as LED lighting is rapidly gaining popularity due to the green credentials of such lighting. Typically, solid state lighting (SSL) devices produce their luminous outputs at a fraction of the energy consumption of incandescent or halogen lighting devices. In addition, solid state lighting devices have superior lifetimes compared to incandescent and halogen lighting devices, which at least partially is due to the increased robustness of SSL devices against impacts compared to such more traditional light sources.

Many SSL element-based lighting devices contain the SSL elements in a housing, e.g. a glass housing such is in the case of metallic reflector (MR) light bulbs, in order to protect the SSL elements as well as to prevent an end user for being able to contact the SSL elements, which could lead to serious injury through electric shock. To this end, such a housing is typically sealed by a cover plate such that the SSL elements are located inside a sealed off space, e.g. an optical chamber, delimited by the housing and the cover plate. The cover plate may be affixed to the housing using an adhesive such as glue or a cement, as is well-known per se.

A problem arises where such lighting devices are used in hostile environments in which corrosive gaseous compounds are present. An example of such a hostile environment is animal farming and in particular poultry farming in which waste products such as ammonia, organic acids and sodium hydroxide (NaOH) are released into the environment. As the adhesive used to affix the cover plate to the housing typically is not airtight, corrosive gaseous compounds can enter the optical chamber of the lighting device, where such compounds can react with the SSL elements or with a reflective metal coating within the optical chamber, thereby deteriorating the optical performance of the lighting device. Where a reflective silver coating is present, it is known from for instance U.S. Pat. No. 6,773,141 B2 to apply a protective layer of a stable protective oxide such as silica to the silver coating, but such protective coatings are not immune from deterioration by such harsh environments. Therefore, it is desirable to prevent such harsh environments from entering the optical chamber of such lighting devices altogether.

SUMMARY OF THE INVENTION

The present invention seeks to provide a lighting device having a hermetically sealed optical chamber that can be used in such harsh environments.

The present invention further seeks to provide a luminaire including at least one such a lighting device.

The present invention yet further seeks to provide a method of manufacturing such a lighting device.

According to an aspect, there is provided a lighting device comprising a glass housing delimiting an optical chamber, wherein at least one solid state lighting element is mounted within the optical chamber, the optical chamber further comprising a light exit window mounted in an aperture of the optical chamber opposite the at least one solid state lighting element, the light exit window comprising a sealing plate sealed to the glass housing by a glass seal; and a light-transmissive thermal bather extending across the optical chamber in between the sealing plate and the at least one solid state lighting element.

The present invention is based on the insight that the optical chamber of the lighting device can be hermetically sealed by sealing the cover plate or sealing plate to the housing with a glass seal. As will be explained in further detail below, this for example may be achieved by melting a glass powder to form such a seal. However, the heat required in such a sealing process typically thermally conducts from the light exit window to the mounting region of the at least one SSL element, causing heating of the SSL element to such an extent that the SSL element may overheat, thus causing damage to the SSL element, which may reduce the lifetime of the lighting device or even render the lighting device inoperable, thereby reducing the yield of the manufacturing process of the lighting device. In order to prevent such overheating, the lighting device further comprises a light-transmissive thermal bather in between the sealing plate and the SSL elements in the optical chamber such that the transmission of thermal energy generated during the melting of the glass powder in order to seal the sealing plate to the glass housing towards the at least one SSL element is significantly reduced.

The sealing plate preferably is a glass plate as such a glass plate typically is airtight, thereby preventing corrosive gaseous compounds from entering the optical chamber, whilst being able to withstand the temperatures required to melt the glass powder for forming the seal between the glass plate and the housing. Typically, the sealing plate and the light-transmissive thermal bather each lie in a plane perpendicular to the optical axis of the lighting device.

The glass seal may be formed using a hard glass such as a borosilicate glass, which has the advantage of a relative low thermal expansion coefficient but requires relatively high temperatures, e.g. in excess of 1000° C., in order to melt the glass. In the context of the present application, where reference is made to the glass melting point, it should be understood that this refers to the temperature at which the glass reaches its flow point or malleable characteristics.

However, in at least some embodiments, the glass seal is made of a glass having a melting point below 500° C., which has the advantage that lower temperatures are required to melt the glass, thereby further reducing the risk of overheating of the at least one SSL element within the lighting device. Such glasses are well-known per se. For example, the glass seal (51) may be made of a soft glass, e.g. a soda lime glass or a lead oxide glass (crystal glass). In an embodiment, the seal is made of a solder glass, e.g a glass used to form a glass ceramic to metal seal, such as for example a solder glass based on the system PbO—ZnO—$B_2O_3$ and other suitable solder glasses as described in U.S. Pat. No. 2,889,952 for example.

The light-transmissive thermal barrier preferably is a further glass plate, as this ensures that the thermal barrier has excellent light-transmissive properties whilst being able to withstand and absorb the thermal energy travelling towards the at least one SSL element during the sealing of the lighting device with the glass powder. The light-transmissive thermal barrier may be affixed to the housing in any suitable manner, such as by screws, an adhesive or cement.

In at least some embodiments, the glass housing comprises a reflective coating around the optical chamber such as on an inner surface of the glass housing in order to redirect light generated by the at least one SSL element towards the light exit window in order to achieve a lighting device with good optical efficiency. Such a reflective coating may be made of any suitable reflective material, e.g. a metal coating such as a silver coating, an aluminium coating or the like.

The lighting device may be a light bulb such as a metal reflector (MR)-type or a parabolic aluminized reflector (PAR)-type light bulb. The light bulb may have any suitable type of base, e.g. a GU-type base, an Edison-type base, a bayonet-type base and so on.

According to another aspect, there is provided a luminaire comprising the lighting device of any of the herein described embodiments. Such a luminaire may be advantageously used in environments in which the luminaire is exposed to corrosive gaseous compounds, as the lighting device can withstand such compounds as previously explained. For example, the luminaire may be a poultry farming luminaire, as such corrosive gaseous compounds, e.g. ammonia, typically are released in high concentrations in poultry farming.

According to yet another aspect, there is provided a method of manufacturing a lighting device, the method comprising providing a glass housing delimiting an optical chamber, wherein at least one solid state lighting element is mounted within the optical chamber, the optical chamber further comprising a light exit aperture opposite the at least one solid state lighting element; affixing a light-transmissive thermal barrier to the glass housing in between the light exit aperture and the at least one solid state lighting element such that the light-transmissive thermal barrier extends across the optical chamber; placing a sealing plate in the light exit aperture to define a light exit window of the lighting device; and sealing the sealing plate to the glass housing by depositing a glass powder in between the sealing plate and the housing and melting the glass powder with a flame. The inclusion of the light-transmissive thermal bather within the glass housing in between the sealing plate and the at least one SSL element substantially blocks thermal energy (heat) generated by the flame during the melting of the glass powder to form the glass seal from reaching the at least one SSL element, thereby preventing the at least one SSL element from overheating and being damaged as a consequence.

Preferably, melting the glass powder with a flame comprises melting the glass powder at a temperature below 500° C. to limit the amount of thermal energy generated during the melting process, thereby further protecting the at least one SSL elements from overheating. This for example may be achieved using a glass powder that is a soft glass powder, preferably a solder glass powder, as solder glass powders are particularly suited to form a glass seal between different types of materials, e.g. different types of glasses.

Affixing the light-transmissive thermal bather to the glass housing may be achieved in any suitable manner. For example, such affixing may comprise securing the light-transmissive thermal bather to the glass housing with screws, an adhesive or cement.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 1:
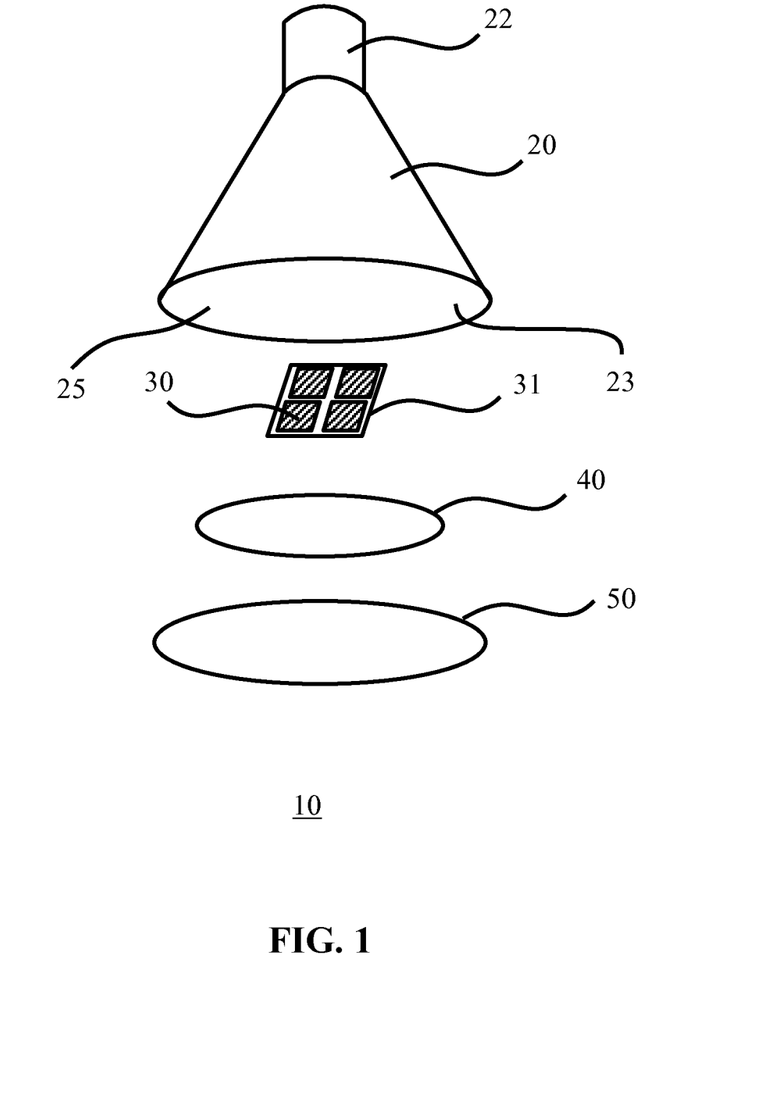
FIG. 1 schematically depicts an exploded view of a lighting device according to an embodiment of the present invention.
Figure 2:
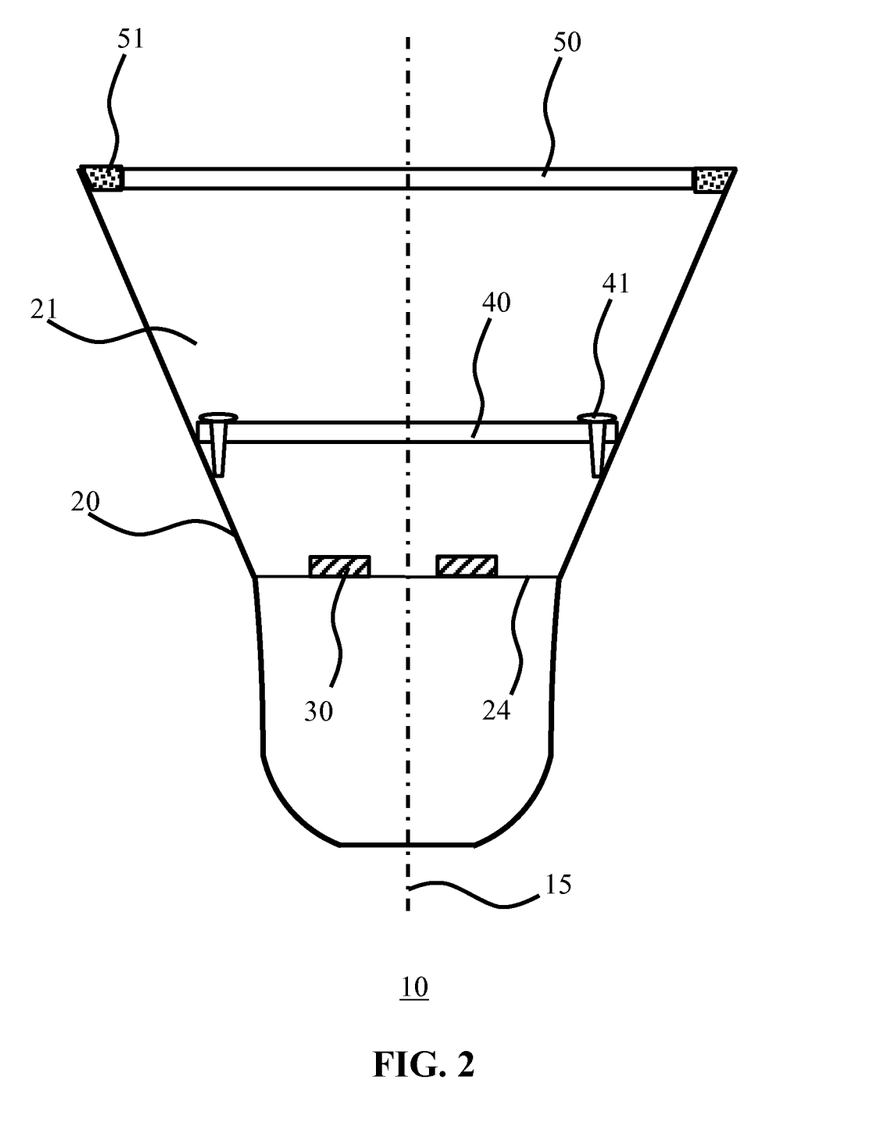
FIG. 2 schematically depicts a cross-sectional view of a lighting device according to an embodiment of the present invention.

FIG. 1 schematically depicts an exploded view and FIG. 2 schematically depicts a cross-sectional view of a lighting device 10 according to an example embodiment of the present invention. The lighting device 10 comprises a glass housing 20 and a base 22, which base 22 typically comprises the connectors for connecting the lighting device 10 to a power supply, e.g. a pair of pins, a bayonet fitting, an Edison fitting, and so on. The base 22 may form an integral part of the glass housing 20 or alternatively may be a separate component potentially made of a different material, typically an electrically insulating material, as the glass housing 20, which separate component is affixed to the glass housing 20 in any suitable manner as is well-known per se.

The glass housing 20 delimits an optical chamber 21 of the lighting device 10, which optical chamber 21 terminates at an aperture 23 for a light exit window at a distal end of the glass housing 20 relative to the base 22. The glass housing 20, or at least the portion of the glass housing 20 extending between the base 22 and the aperture 23, may have any suitable shape. In at least some embodiments, the glass housing 20 tapers outwardly in a direction from the base 22 to the aperture 23. For example, the glass housing 20 may have a parabolic shape in some embodiments although it should be understood that other tapering shapes are equally suitable.

The glass housing 20 may be made of any suitable type of glass. For example, the glass housing 20 may be an aluminosilicate glass comprising silica, alumina, lime, magnesia, barium oxide (BaO) and boric oxide ($B_2O_3$) although other types of glass, e.g. a fused quartz glass or a sodium borosilicate glass may be contemplated. A surface of the glass housing 20 delimiting the optical chamber 21, e.g. an inner surface of the glass housing 20 may further carry a reflective coating 25 such as a metal coating. Suitable metals for such a coating include silver and aluminium although other suitable coating materials, e.g. other suitable metal coatings, may be contemplated.

Within the optical chamber 21 one or more SSL elements 30 are mounted on a mounting surface 24, which mounting surface 24 for example may form part of the base 22. The one or more SSL elements 30 may be directly mounted onto the mounting surface 24 or may be mounted on a common carrier 31 such as a printed circuit board or the like, which common carrier 31 is mounted onto the mounting surface 24. Alternatively, such a common carrier 31 may be suspended within the optical chamber 21, in which case the mounting surface 24 may not be present. The one or more SSL elements 30 are typically arranged such that their luminous output is directed towards the aperture 23 of the optical chamber 21, e.g. with the assistance of the reflective coating 25, which may redirect any light generated by the one or more SSL elements 30 incident thereon towards the aperture 23. Any suitable type of SSL element may be used for this purpose. For example, the one or more SSL elements 30 may be LEDs, e.g. white light LEDs, which may be dimmable. Alternatively, the one or more SSL elements 30 may be configured to generate light of a particular spectral composition, e.g. a particular colour temperature or colour.

The spectral composition generated by the one or more SSL elements 30 may be configurable, e.g. to change a colour temperature or a colour output of the lighting device 10. To this end, the lighting device 10 may further comprise a controller (not shown) configured to control the one or more SSL elements 30 in order to change the spectral composition of the luminous output of the lighting device 10. Such a controller may be controlled in any suitable manner, e.g. through a control signal embedded in the power supply signal or through a dedicated control signal, e.g. a wireless control signal in which case the controller may include a wireless communication module for receiving the control signal. The controller may be adapted to alter the spectral composition of the luminous output of the lighting device 10 through altering the spectral composition of the luminous output of individual SSL elements 30 or through altering the composition of a group of SSL elements 30. The latter may for example be applicable where the lighting device 30 comprises a plurality of SSL elements 30 producing respective luminous outputs having different fixed spectral compositions, in which the selection of particular SSL elements 30 from said plurality can generate the desired spectral composition of the overall luminous output of the lighting device 10 by colour mixing of the respective individual luminous outputs of the selected SSL elements 30.

The lighting device 10 further comprises a sealing plate 50 within the aperture 23, which sealing plate 50 is sealed against the glass housing 20 by a glass seal 51. The sealing plate 50 is made of optically transmissive material that can withstand the temperatures required to form the glass seal 51. For example, the sealing plate 50 may be made of optically transparent or optically translucent material such as glass. In case of a glass sealing plate 50, the glass composition of the sealing plate 50 may be the same as the glass composition of the glass housing 20 although this is not strictly necessary. As with the glass housing 20, the sealing plate 50 may be made of any suitable type of glass. For example, the sealing plate 50 may be an aluminosilicate glass comprising silica, alumina, lime, magnesia, barium oxide (BaO) and boric oxide ($B_2O_3$) although other types of glass, e.g. a fused quartz glass or a sodium borosilicate glass may be contemplated.

The glass seal 51 equally may be made of any suitable type of glass although preferably the glass composition of the glass seal 51 is such that the glass seal 51 has a lower melting point than the sealing plate 50 or the glass housing 20 such that upon melting of the glass in order to form the glass seal 51 the sealing plate 50 or the glass housing 20 are not damaged. In a particularly advantageous embodiment, the glass composition of the glass seal 51 has a melting point of below 1000° C., more preferably has a melting point of below 500° C. For example, the glass seal 51 may be made of a soft glass such as a soda lime glass or even more preferably is made of a lead oxide glass such as a solder glass, which glasses may be specifically designed to form a seal between two different entities, e.g. entities made of different types of materials.

Figure 3:
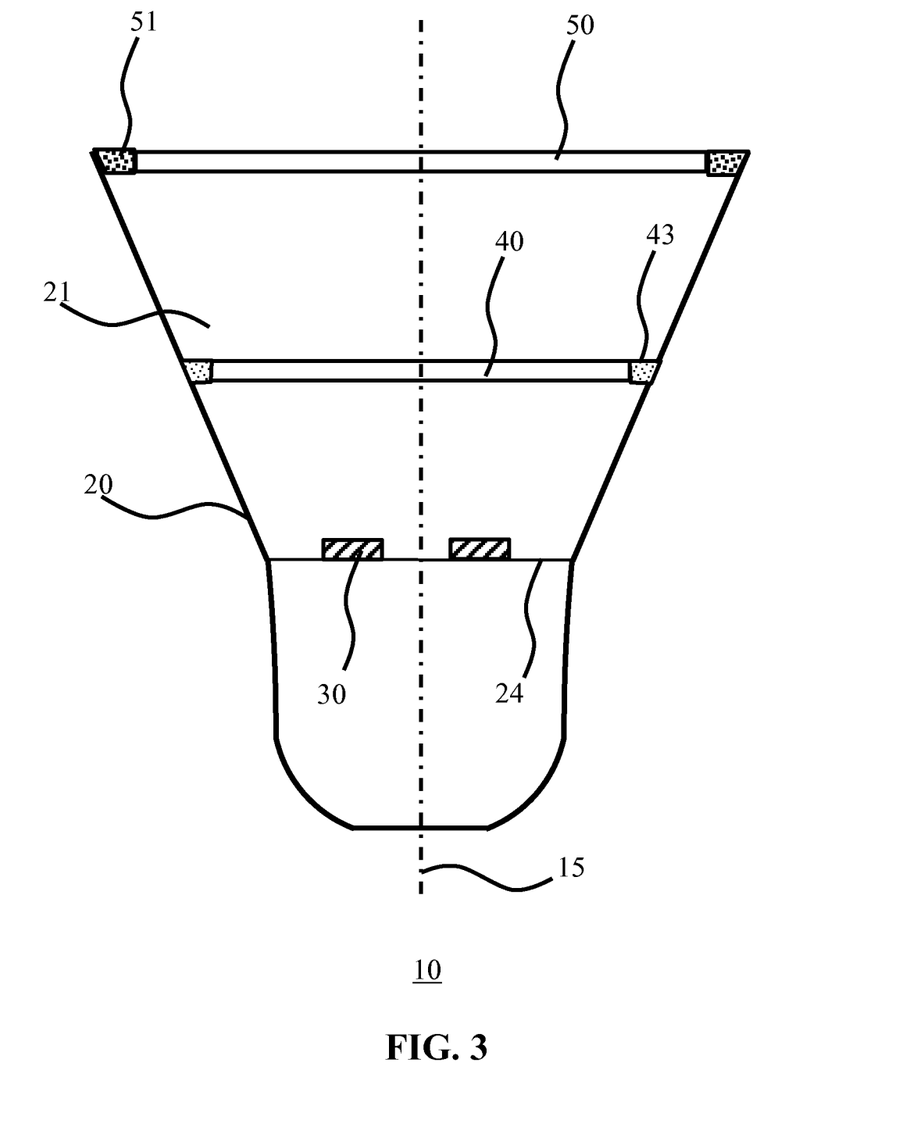
FIG. 3 schematically depicts a cross-sectional view of a lighting device according to an embodiment of the present invention.

The lighting device 1 further includes a light-transmissive thermal bather 40 in the optical chamber 21 in between the sealing plate 50 and the one or more SSL elements 30. The light-transmissive thermal bather 40 may be transparent or translucent. The light-transmissive thermal bather 40 and the sealing plate 50 are typically arranged such that they each lie in a plane perpendicular to the optical axis 15 of the lighting device 10 (where such an optical axis 15 is present). The light-transmissive thermal bather 40 may be made of any suitable material and is preferably made of glass having the same composition as the sealing plate 50 although alternatively the light-transmissive thermal bather may be made of a glass having a different composition to that of the sealing plate 50. The light-transmissive thermal bather 40 may be made of any suitable type of glass. For example, the light-transmissive thermal barrier 40 may be an aluminosilicate glass comprising silica, alumina, lime, magnesia, barium oxide (BaO) and boric oxide ($B_2O_3$) although other types of glass, e.g. a fused quartz glass or a sodium borosilicate glass may be contemplated. The light-transmissive thermal barrier 40 may be affixed to the glass housing 20 in any suitable manner. In FIG. 2, the light-transmissive thermal barrier 40 is affixed to the glass housing 20 by a set of screws 41, whereas in FIG. 3 the light-transmissive thermal barrier 40 is affixed to the glass housing 20 by an affixing material such as an adhesive or cement.

Figure 4:
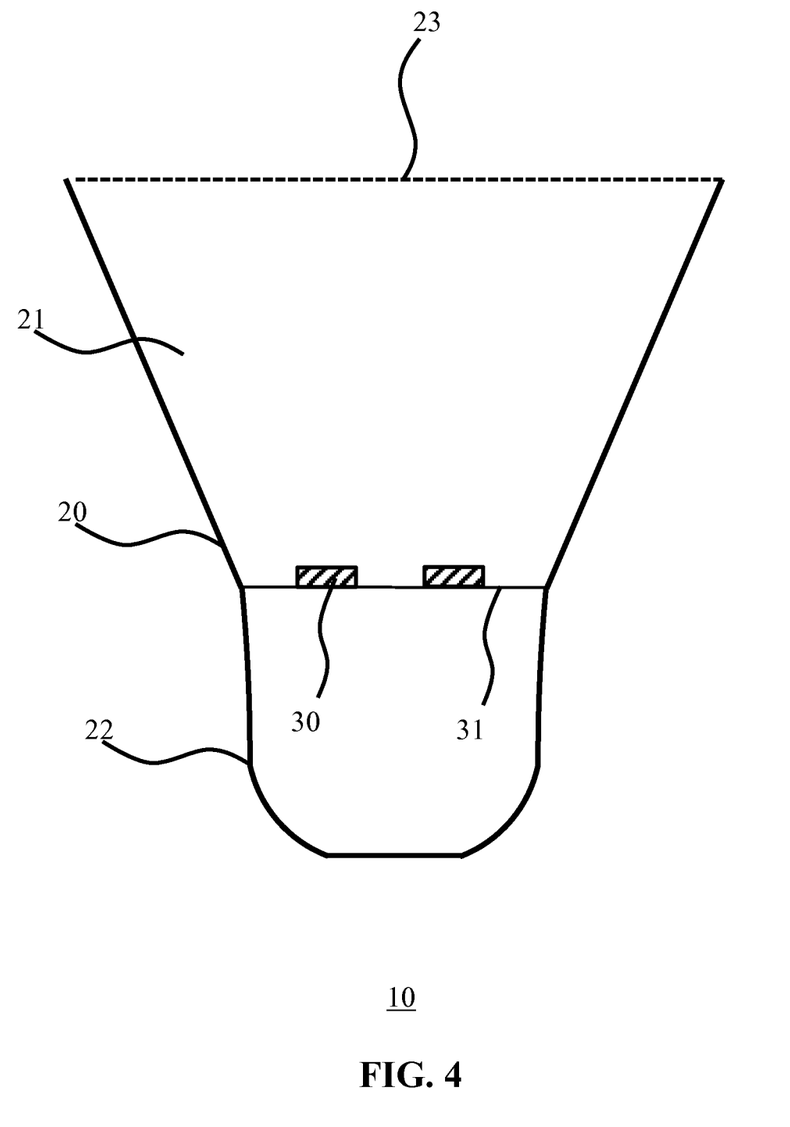
FIGS. 4-6 schematically depict steps of manufacturing such a lighting device with a method according to an embodiment of the present invention.

The purpose of the light-transmissive thermal barrier 40 is to protect the one or more SSL elements 30 from being directly exposed to any thermal radiation generated during the manufacture of the lighting device 10, as will be explained in more detail with the aid of FIG. 4-6, which schematically depict the key steps of a manufacturing method of such a lighting device 10 in accordance with an example embodiment of the present invention. As schematically depicted in FIG. 4, such a manufacturing method typically includes the provision of the glass housing 20 delimiting an optical chamber 21 as previously explained, with at least one SSL element 30 having been mounted within the optical chamber 21 such that the at least SSL element 30 is mounted opposite the aperture 23 of the optical chamber 21. It is entirely straightforward for the skilled person to provide such an intermediate structure and this therefore will not be explained in further detail for the sake of brevity only.

Figure 5:
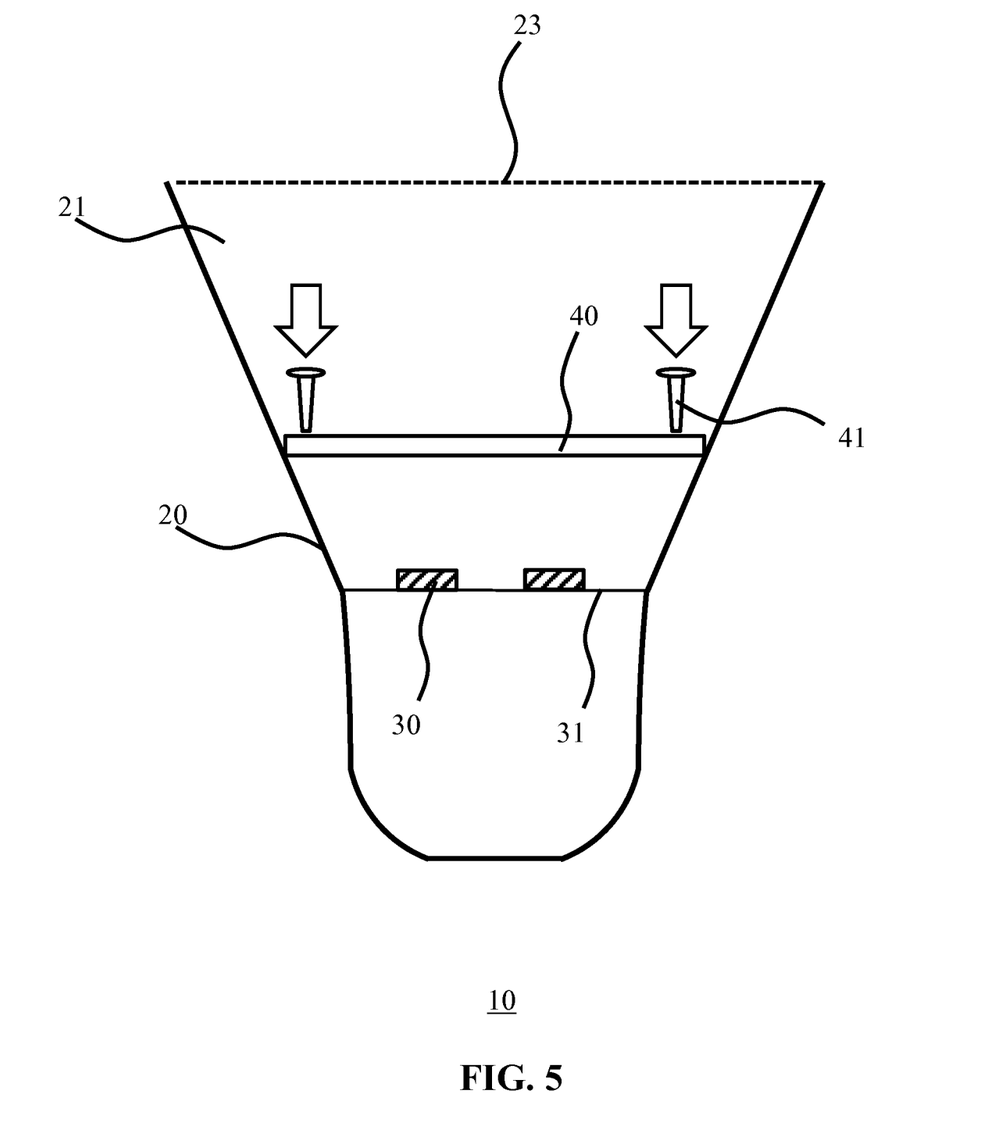
Figure 6:
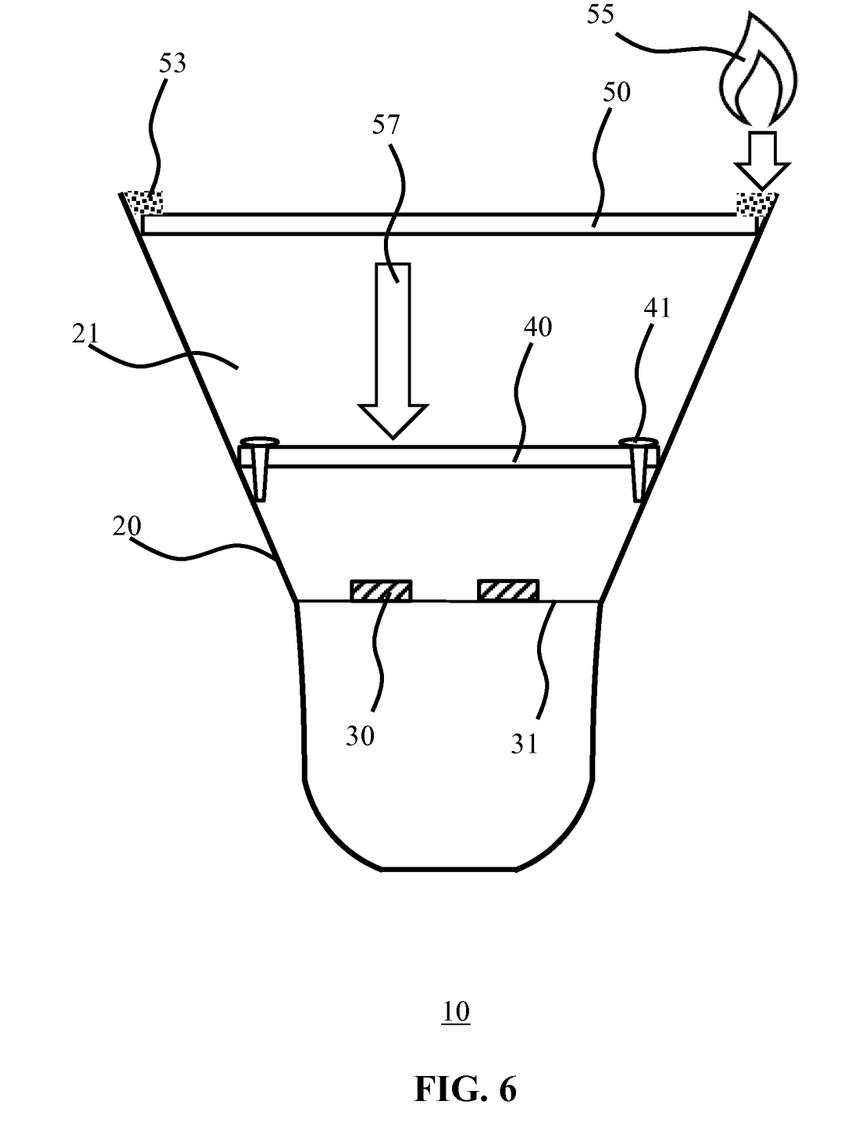

As schematically depicted in FIG. 5, in a next step the light-transmissive thermal barrier 40 is affixed to the glass housing 20 in between the light exit aperture 23 and the at least one solid state lighting element 30 such that the light-transmissive thermal barrier 40 extends across the optical chamber 21. As previously explained, the light-transmissive thermal barrier 40 may be affixed to the glass housing in any suitable manner, e.g. using affixing means such as screws or an affixing material such as an adhesive or cement.

The manufacturing of the lighting device 10 may be completed by placing a sealing plate 50 in the light exit aperture 23 to define a light exit window of the lighting device 10 and subsequently sealing the sealing plate 50 to the glass housing 20 by depositing a glass powder 53 in between the sealing plate 50 and the glass housing 20 and melting the glass powder 53 with a flame 55. In the context of the present application, the flame 55 represents any suitable heat source capable of exposing the glass powder 53 to a sufficiently high energy flux that causes the glass powder 53 to melt, thereby forming the glass seal 51 between the glass housing 20 and the sealing plate 50. As previously explained, the glass powder 53 preferably has a composition that allows the glass powder 53 to melt at temperatures below 500° C. to limit the flux of thermal radiation towards the at least one SSL element 30, which may be achieved using glass compositions such as soda lime glass compositions or solder glass compositions, e.g. lead oxide glass compositions.

The glass seal 51 ensures that the optical chamber 21 is hermetically sealed, in particular is impermeable to gaseous compounds such that the lighting device 10 may be used in environments in which corrosive gaseous compounds such as ammonia may be commonplace. Such corrosive gaseous compounds for example are commonly present in enclosed farming environments in which livestock is present, which is particularly but not exclusively the case in poultry farming environments. Consequently, the glass seal 51 ensures that the internals of the optical chamber 21 such as the reflective coating 25 (if present) and the at least one SSL element 30 are not exposed to such corrosive gaseous compounds, thereby extending the lifetime of the lighting device 10, at least in terms of maintained optical performance of the lighting device 10.

During the sealing of the sealing plate 50 to the glass housing 20 with the glass powder 53, care has to be taken that the thermal radiation flux resulting from the exposure of the glass powder 53 to the flame 55 does not overheat the at least one SSL element 30, which could cause failure of such an SSL element, in particular if the SSL element is heated to temperatures in excess of 100° C. Such overheating during the formation of the glass seal 51 between the sealing plate 50 and the glass housing 20 is prevented by the light-transmissive thermal bather 40 in between the light exit aperture 23 and the at least one SSL element 30, which light-transmissive thermal bather 40 reflects and/or absorbs the thermal radiation generated during the melting process of the glass powder 53, thereby at least temporarily reducing the thermal radiation flux reaching the at least one SSL element 30 and consequently protecting the at least one SSL element 30 from overheating. The heat capacity of the light-transmissive thermal bather 40 typically is such that the light-transmissive thermal bather 40 can absorb most of the thermal radiation generated for the duration of the sealing process of the sealing plate 50 to the glass housing 20 with the glass powder 53, such that the at least one SSL element 30 is exposed to modest temperature rises only, i.e. reaches a temperature well below 100° C., thereby protecting the at least one SSL element 30 from thermal radiation damage to overheating and consequently improving the manufacturing yield of the lighting device 10.

The lighting device 10 in at least some embodiments is a light bulb, which light bulb may have any suitable shape. For example, the light bulb may be a MR-type or PAR-type light bulb having any suitable type and dimensioned connectors although it should be understood that embodiments of the lighting device 10 of the present invention are not limited to such light bulbs. The lighting device 10, e.g. one or more light bulbs, may form part of a luminaire, e.g. a ceiling-mounted luminaire such as a troffer or a ceiling-pendant luminaire, with the luminaire in example embodiments being specifically designed for illumination of an enclosed livestock farming space such as a poultry farming space.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device comprising a glass housing delimiting an optical chamber, wherein at least one solid state lighting element is mounted within the optical chamber, the optical chamber further comprising:
   a light exit window mounted in an aperture of the optical chamber opposite the at least one solid state lighting element, the light exit window comprising a sealing plate sealed to the glass housing by a glass seal; and
   a light-transmissive thermal barrier extending across the optical chamber in between the sealing plate and the at least one solid state lighting element.

2. The lighting device of claim 1, wherein the sealing plate is a glass plate.

3. The lighting device of claim 1, wherein the glass seal is made of a glass having a melting point below 500° C.

4. The lighting device of claim 1, wherein the glass seal is made of a soft glass or a solder glass.

5. The lighting device of claim 1, wherein the light-transmissive thermal barrier is a further glass plate.

6. The lighting device of claim 1, wherein the light-transmissive thermal barrier is affixed to the housing by screws, an adhesive or cement.

7. The lighting device of claim 1, wherein the sealing plate and the light-transmissive thermal barrier each lie in a plane perpendicular to the optical axis of the lighting device.

8. The lighting device of claim 1, wherein the glass housing comprises a reflective coating around the optical chamber.

9. The lighting device of claim 1, wherein the lighting device is a light bulb.

10. A luminaire comprising the lighting device of claim 1.

11. The luminaire of claim 10, wherein the luminaire is a poultry farming luminaire.

12. A method of manufacturing a lighting device, the method comprising:
   providing a glass housing delimiting an optical chamber, wherein at least one solid state lighting element is mounted within the optical chamber, the optical chamber further comprising a light exit aperture opposite the at least one solid state lighting element;

affixing a light-transmissive thermal barrier to the glass housing in between the light exit aperture and the at least one solid state lighting element such that the light-transmissive thermal barrier extends across the optical chamber;

placing a sealing plate in the light exit aperture to define a light exit window of the lighting device; and sealing the sealing plate to the glass housing by depositing a glass powder in between the sealing plate and the housing and melting the glass powder with a flame.

13. The method of claim 12, wherein melting the glass powder with the flame comprises melting the glass powder at a temperature below 500° C.

14. The method of claim 12, wherein the glass powder is a soft glass powder or a solder glass powder.

15. The method of claim 12, wherein affixing the light-transmissive thermal barrier to the glass housing comprises securing the light-transmissive thermal barrier to the glass housing with screws, an adhesive or cement.

* * * * *